Figure 1:
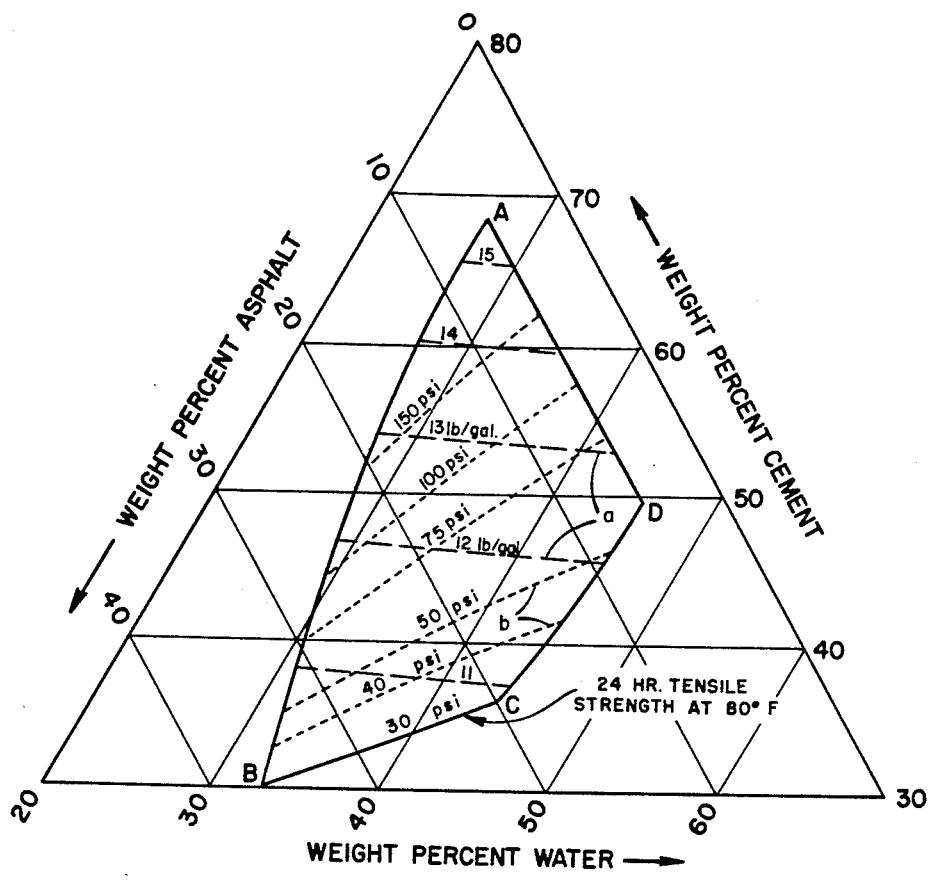

Dec. 25, 1962  W. G. BEARDEN ET AL  3,070,450
BLOWN ASPHALT CEMENTS
Filed Nov. 25, 1959  3 Sheets-Sheet 3

ASPHALT EMULSION

BLOWN ASPHALT CEMENT

BLOWN ASPHALT KEROSENE EMULSION CEMENT

WILLIAM G. BEARDEN
JOE C. STALL
INVENTORS

Arthur McElroy

ATTORNEY

United States Patent Office 3,070,450
Patented Dec. 25, 1962

3,070,450
BLOWN ASPHALT CEMENTS
William G. Bearden and Joe C. Stall, Tulsa, Okla., assignors to Pan American Petroleum Corporation, Tulsa, Okla., a corporation of Delaware
Filed Nov. 25, 1959, Ser. No. 855,300
10 Claims. (Cl. 106—96)

This invention is concerned with cement compositions of the type suitable for oil field application. More particularly, it relates to a new and improved cement containing blown asphalt, which imparts a number of desirable properties to the composition.

Numerous disadvantages exist in the various kinds of cements now used in oil field work. For example, the slurry weight of some cements is so great that they produce excessive bottom hole pressures which, in turn, result in loss of cement to the formation via fractures, etc. When it is desired to reduce the slurry weight of cements containing bentonite, diatomaceous earth, etc., by the addition of water, so much of the latter must be added to obtain any weight reduction that the strength of the cement is seriously impaired. Also, with cements currently available, excessive shattering or fracturing occurs when casing backed by such cement is perforated. This is not only bad from the standpoint of permitting leakage of water from above or below the perforation into the well, but also aggravates the corrosion problem. Moreover, we have observed that in the case of many cements, e.g., neat Portland cement, the bond strength is affected by electrolysis, showing a trend to a weakened bond with an increase in ampere exposure time. This bond damage is caused by failure of the cement due to migration of cations to the casing (cathode).

Accordingly, it is an object of our invention to provide a light-weight cement suitable for use in high column cementing jobs, and having good perforating characteristics and relatively high tensile strength. It is also an object of our invention to provide a cement composition offering substantially increased protection to the casing from electrolytic or other types of corrosion. Another object of our invention is to provide a cement that can be perforated without fracturing, thereby preventing communication of fluids past the annular cement. Still another object of our invention is to provide a cement composition having reduced fluid loss.

Briefly, our invention contemplates the incorporation of a preferably dry, granular or powdered blown asphalt into Portland or other hydraulic cement slurries with or without a non-volatile mineral oil. The weight ratio of blown asphalt to cement used may generally vary from 1:1 to about 1:13. With the use of mineral oil in these compositions, the maximum ratio of asphalt to cement that can be employed decreases as the oil content increases due to the resulting slurry becoming too thick for practical application.

In preparing these cements, a dry mixture of the asphalt and cement in proper proportions is added to the mineral oil and/or water and blended in a high-speed jet or equivalent mixer. Within a short time the composition is ready for use. In the case of compositions employing both blown asphalt and a refined mineral oil such as, for example, kerosene, the appearance of the material varies from gray to black, depending upon the amount of oil used. While the effect of particle size of the blown asphalt on cement properties has not been evaluated, we generally prefer to use the smaller particle sizes, e.g., ranging in screen size from about 14 mesh to pan, with approximately 90 percent of the particles being smaller than 14 mesh and larger than 100 mesh. The use of smaller particle size blown asphalt is advantageous where it is desired to avoid the hazards of premature bridging. If lost circulation characteristics are important, the asphalt should include a portion, say 50 percent, of a larger particle size, e.g., from about 4 to about 10 mesh.

Mineral oils suitable for use in preparing certain of the compositions of our invention may be selected from a number of crude oil fractions or, in some instances, crude oil itself may be used. To avoid vaporization of the oil, which may establish an undesirable degree of permeability in the cement while it is setting, the oil should have a relatively low volatility. By this, we mean any crude petroleum or fraction thereof having a vapor pressure less than the pressure under which the cement slurry is to set in the well. Normally, a light oil fraction, such as kerosene or diesel fuel, is most desirable. Gasoline is too volatile for most purposes and, in addition, is considered too hazardous for the majority of uses. Many crude oils have light ends which are too volatile, and some contain an undesirable amount of natural emulsifying agents. Most crude oils should be avoided for these reasons.

In addition to the blown asphalt and cement, certain inert or extender materials may be present. For example, the water used may contain inorganic salts or the cement may contain a small amount of inert solids. The composition, however, should consist essentially of blown asphalt, cement, kerosene and/or water in the limits of concentration hereinafter referred to. Diluents or extenders, as previously indicated, may or may not be present. If they are present, they should constitute not more than about 5 percent by weight of the slurry. Also, any of the usual cement retarders or accelerators may be incorporated in the customary amounts.

We have found that the above-mentioned desirable characteristics are present in cements of the type contemplated herein only if the ratio of ingredients is maintained within certain rather well-defined limits. These limits, in the case of compositions consisting essentially of blown asphalt, cement and water, are illustrated by reference to the ternary diagram in FIGURE 1. Thus, the compositions possessing properties which make them highly desirable as oil well cements are illustrated by the area within the lines connecting points A, B, C and D. The long-dashed lines designated "a" show the slurry weights of cements whose composition is represented by a point falling on or near any of the so designated lines. Short-dashed lines "b" represent specific tensile strengths of cements having the indicated composition after curing for 24 hours at 80° F. Cement slurries having a composition falling to the left of line AB are too thick for convenient handling owing to insufficient mixing water. Below line BC, the strengths are insufficient for general cementing practices. To the right of line CD, the slurries are too thin for satisfactory solid suspensions. To the right of line AD, the cements do not contain enough asphalt to produce a cured product materially different from neat cement. The area ABCD, then, defines a series of cementing compositions with slurry weights ranging from about 10 pounds per gallon to 15 pounds per gallon and having tensile strengths ranging from about 30 to about 200 p.s.i.

Figure 2:
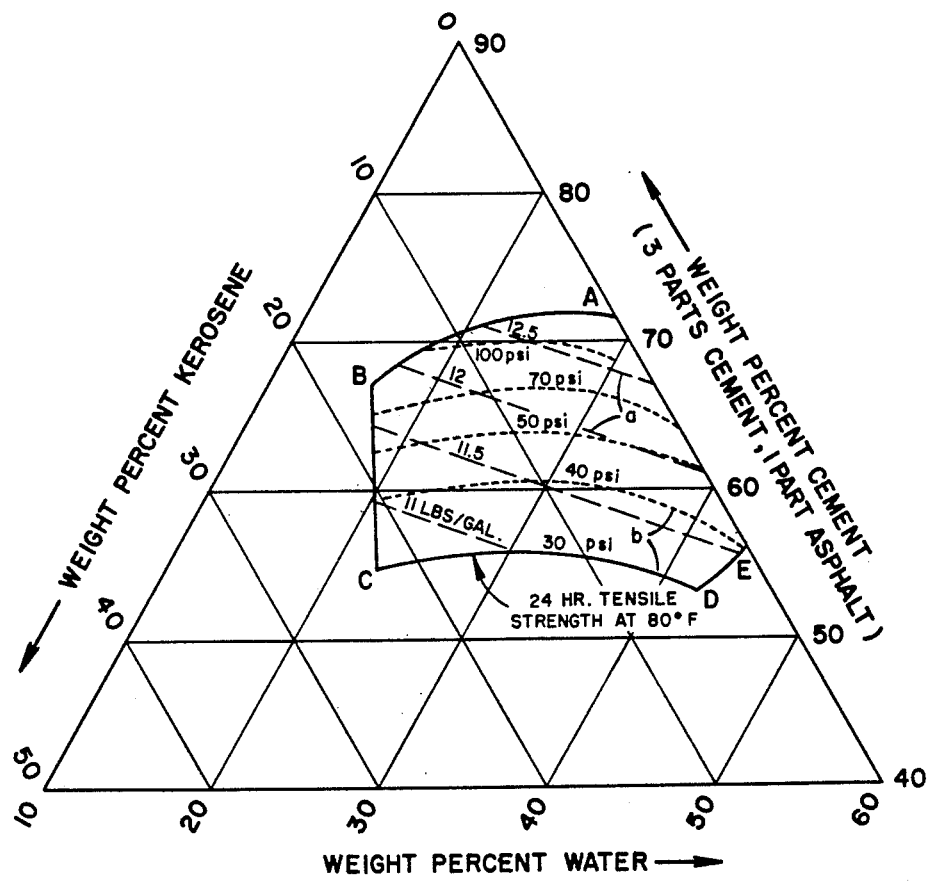

FIGURE 2 shows specific compositions prepared by adding kerosene and water to a mixture containing blown asphalt and cement in a weight ratio of 1:3. These slurries possess properties which render them outstanding for oil field use. The composition ranges capable of giving a cement having the desired properties lie within the area surrounded by lines connecting points A, B, C, D and E. As in FIGURE 1, the long-dashed lines designated "$a$" indicate slurry densities (lbs./gal.), while the short-dashed lines "$b$" show tensile strengths (lbs./sq. in.) developed in 24 hours at 80° F., as a function of composition. Above line AB, the consistencies of the slurries are generally too high, making them difficult to handle. To the left of the boundary BC, the external phase of the slurry reverts from water to kerosene and will not set. Below the line CD, the strengths are inadequate and below the line DE, the slurries are thin and the components seem to separate. Thus, the area ABCDE defines light-weight cementing materials having the practical and desirable characteristics of a good oil field cement. The maximum density is about 13 pounds per gallon, indicated at A. The minimum density is slightly greater than 10.5 pounds per gallon for compositions adjacent point C. The cements within the aforesaid defined area have tensile strengths ranging from 30 to about 100 p.s.i.

*Table I*

| Percent Kerosene | Percent Blown Asphalt | Percent Water | Percent Cement | Remarks |
| --- | --- | --- | --- | --- |
| 0 | 36 | 34 | 30 | Maximum asphalt concentration and minimum cement. |
| 0 | 5 | 27 | 68 | Minimum asphalt concentration and maximum cement. |
| 0 | 5 | 46 | 49 | Minimum asphalt and maximum water. |
| [1] 5 | 18 | 23 | 54 | Maximum asphalt and cement. |
| [1] 20 | 15 | 20 | 45 | Maximum asphalt for cement containing 20% kerosene. |
| [1] 22 | 14 | 22 | 42 | Maximum kerosene. |

[1] The above stated maxima and minima are concerned with cements in which the ratio of asphalt to cement is 1:3. For other asphalt-cement ratios different maxima and minima apply.

In order to demonstrate the advantages the novel cement compositions of our invention have over neat cement, asphalt emulsion cement and kerosene emulsion cement, the following table is included which gives a typical composition for each of the cements involved.

*Table II*

| Type of Cement | Slurry Composition, Wt. Percent | Density, Lbs./Gal. | Fluid Loss at 80° F. | Minimum Bottom Hole Temperature to Develop 50 p.s.i. Tensile Strength in 24 hours, ° F. | Electrical Resistivity, ohm-cm. | Perforating Characteristics | Proposed Uses |
| --- | --- | --- | --- | --- | --- | --- | --- |
| Neat Portland | 68.5 cement, 31.5 water. | 15.5 | 115 cc./1.5 min. | <80 | 1,062 | Poor | Conventional jobs. |
| Kerosene Emulsion Cement | 48 cement, 22 kerosene, 30 water. | 11.5 | 204 cc./1.0 min. | 80 | 1,151 | Fair | High column cementing jobs and in corrosive areas. |
| Asphalt Emulsion Cement | 62 cement, 10 asphalt, emulsion, 28 water. | 14.4 | 75 cc./3.2 min. | 80 | 1,135 | Fair | Low fluid loss jobs, highly corrosive areas, and jobs where low permeability is required. |
| Blown Asphalt Cement | 42 cement, 24 blown asphalt, 34 water. | 11.5 | 85 cc./0.5 min. | 80 | 1,264 | Good | High column cementing, highly corrosive areas; not recommended where low fluid loss properties are required. |
| Blown Asphalt-Kerosene Emulsion Cement. | 48 cement, 16 asphalt, 15 kerosene, 21 water. | 11.5 | 60 cc./8.4 min. | 80 | 2,522 | Good | High column cementing, highly corrosive areas, where low fluid loss properties are required. Substitute for neat cement. |

FIGURE 2 defines the useable range of compositions for slurries exhibiting a constant asphalt-cement ratio of 1:3; however, this invention is not limited by this ratio. For example, FIGURE 1 shows that suitable cements are formed at a ratio of 1:1, i.e., 30 percent cement, 36 percent asphalt, 34 percent water. Kerosene can be added to this mixture, however, the consistency of the slurry would increase and would soon be too thick for practical application. Thus, in a ternary diagram for slurries of 1:1 asphalt-cement ratio, the useable range of slurries would be represented by essentially one point (35 percent asphalt, 30 percent cement, 1 percent kerosene and 34 percent water). This useable area would increase in size with decreasing asphalt-cement ratios and would be as shown on FIGURE 2 for a 1:3 mixture. At still lower ratios (decreasing asphalt), the area increases in size. At ratios less than about 1:13, the advantages of the asphalt become nil.

The table below illustrates further the composition of typical cements coming within the scope of our invention. These figures show the weight relationships that should be maintained in order to retain the desired characteristics in the cements of our invention and particularly point out how, as the mineral oil concentration increases, the blown asphalt content decreases.

It will be observed from the above table that the kerosene emulsion cements, the blown asphalt cements and the blown asphalt-kerosene emulsion cements all form light-weight slurries. These three types of cements can be mixed so as to give a density of 11.5 pounds per gallon and still develop a tensile strength of 50 p.s.i. within 24 hours at 80° F. Higher strengths can, of course, be achieved if higher densities are permissible. The advantage of using blown asphalt as an additive to produce light-weight cements is also shown in the above table, as well as in FIGURE 1. Such cements have been prepared having densities ranging from slightly below 10.5 up to about 16.5 pounds per gallon. The fluid loss characteristics of blown asphalt cements are higher than those of neat Portland cement. However, the relatively high fluid loss properties can be of value in squeeze cementing operations to obtain high final squeeze pressure and reduce the amount of cement required. The resistivity measurements indicate that this type cement offers better cathodic protection than neat Portland cement, kerosene emulsion cement and asphalt emulsion cement. The pumpability time is not affected by the blown asphalt and the slurry develops strength for most field applications. Mixing in the field is accomplished by dry blending the asphalt in the cement at the bulk blending station like any other cement additive, hauling to location then mixing with water in the conventional manner.

The results in the above table, as well as in FIGURE 2, show that slurries formed with blown asphalt, kerosene, water and cement exhibit slurry weights less than 11 pounds per gallon. The pumpability time as compared with neat Portland cement, is not appreciably affected and the fluid loss approaches that of low fluid loss cement. Cathodic protection and fluid loss characteristics are appreciably improved by those properties exhibited by neat cements. In field operations, the blown asphalt-kerosene emulsion cements are mixed by blending the blown asphalt and the dry cement at bulk stations then adding this blend to a fixed ratio of kerosene and water metered into a jet mixer.

The ordinary asphalt emulsion cement slurries are shown in the above table to exhibit only moderate reductions in slurry weight, while the low fluid loss characteristics offer an improvement over those of neat Portland cement slurries. With certain blends of A.P.I. class A cements, the asphalt emulsion used therewith was observed to cause a high false body gel or premature thickening of the slurry within the first 30 minutes after mixing. This trend was not constant and appeared to vary with the temperature, the blend of cement and the batch of asphalt emulsion. Compared to blown asphalt cement and blown asphalt-kerosene emulsion cement, the asphalt emulsion cement is less desirable from the standpoint of electrical resistivity.

Figure 3:
Figure 4:
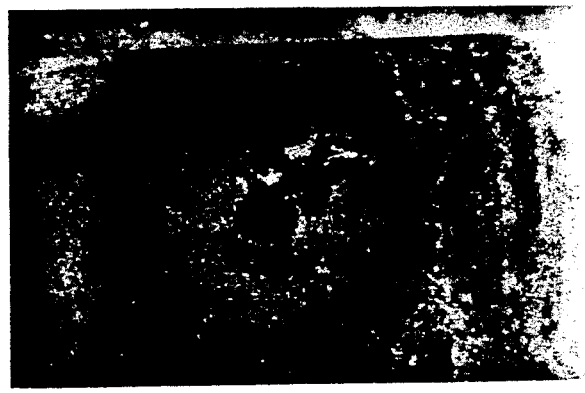
Figure 5:
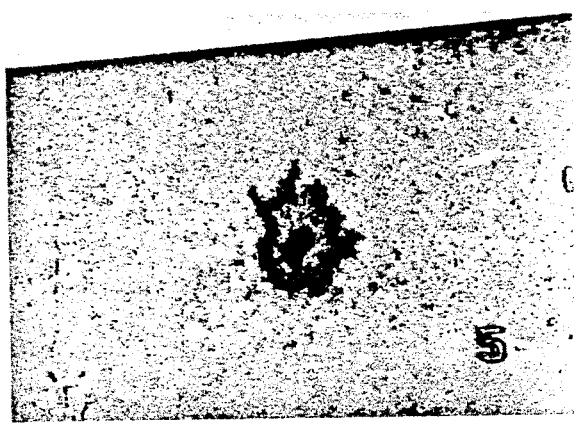

The exceedingly good perforating characteristics of the blown asphalt cements of our invention are shown and compared to the results obtained with ordinary asphalt emulsion cement in FIGURES 3, 4 and 5. In each case, the composition of the cement used was the same as that indicated in the table above. To test the perforating characteristics of the cements, the annular space between 18-inch lengths of 5½-inch casing and 10¾-inch casing was filled with each type of cement, cured for 72 hours and perforated with a single Du Pont 26–A shaped jet charge. After shooting, the outer casing was removed to expose the perforated section of the cement. For comparative purposes, a neat Portland test specimen was poured and perforated at the same time as the special cements. While the results of perforating tests on neat Portland cement are not illustrated by actual photographs, the notation appearing in the above-mentioned table adequately describes the perforating characteristics of this material.

The exceedingly good perforating characteristics of the blown asphalt cements of our invention are shown and compared with the results obtained with ordinary asphalt emulsion cement in FIGURES 3, 4 and 5. In each case, the composition of the cement used was the same as that indicated in the table above. While the ordinary asphalt emulsion cement performed better in perforation tests than either neat cement or kerosene emulsion cement, fractures (designated by the arrows) can be seen in FIGURE 3 extending radially from the perforation. Although the ability of such cement to withstand the shock of perforating operations can be improved by the addition of more asphalt, this results in a substantial reduction in tensile strength.

The improved perforating characteristics of the blown asphalt emulsion cement are shown in FIGURE 4. It will be seen that no shattering or cracking of the cement occurred. The irregular portion of the perforation was caused by deflection of a small piece of the copper liner from the shaped charge. As can be seen from FIGURE 1, a blown asphalt emulsion cement having a composition corresponding to that employed in preparation of the test section shown in FIGURE 4, has a tensile strength slightly under 75 p.s.i.

FIGURE 5 shows results from perforating a blown asphalt-kerosene emulsion cement having the composition indicated in the above-mentioned table. This figure likewise shows that no shattering or cracking occurred during the perforating operation and indicates that the blown asphalt in the composition imparts sufficient resiliency to the cement to withstand the shock imposed by the perforating charge. At the same time, the tensile strength of this cement, as may be seen from FIGURE 2, is of the order of 50 p.s.i.

We claim:
1. A pumpable blown asphalt hydraulic cement slurry in which the weight ratio of blown asphalt to cement ranges from about 1:1 to about 1:13 and from about 25 to about 45 weight percent water, said asphalt and cement being the essential solid components of said slurry.
2. A pumpable slurry having as its essential solid ingredients blown asphalt and a hydraulic cement in which said asphalt and cement are present in a weight ratio of from about 1:1 to about 1:13, and from about 25 to 35 weight percent water together with from about 1 to about 25 weight percent of a non-volatile mineral oil.
3. The composition of claim 2 in which the non-volatile mineral oil is kerosene.
4. The composition of claim 2 in which the non-volatile mineral oil is diesel oil.
5. A pumpable aqueous blown asphalt-non-volatile mineral oil oil, well Portland cement slurry containing from about 5 to about 35 weight percent blown asphalt, from about 5 to about 20 weight percent of a non-volatile mineral oil having a vapor pressure less than that of gasoline, from about 30 to about 70 weight percent cement and from about 20 to about 35 weight percent water, said asphalt and cement being the essential solid components of said slurry.
6. The composition of claim 5 in which the mineral oil is kerosene.
7. The composition of claim 5 in which the mineral oil is diesel oil.
8. The cement slurry of claim 1, in which Portland cement is employed.
9. The slurry of claim 2, in which the hydraulic cement is Portlant cement.
10. The composition of claim 1 in which the blown asphalt is in a dry, finely divided form.

References Cited in the file of this patent

UNITED STATES PATENTS

| | | |
|---|---|---|
| 1,563,755 | Leonardt | Dec. 1, 1925 |
| 1,599,903 | Lord | Sept. 14, 1926 |
| 1,711,727 | Forrest | May 7, 1929 |
| 1,726,708 | Levin | Sept. 3, 1929 |
| 1,744,869 | Cross | Jan. 28, 1930 |
| 2,297,660 | Mazee | Sept. 29, 1942 |
| 2,776,010 | Rike | Jan. 1, 1957 |
| 2,798,003 | Morgan et al. | July 2, 1957 |
| 2,812,161 | Mayhew | Nov. 5, 1957 |
| 2,861,004 | Sucetti | Nov. 18, 1958 |
| 2,878,875 | Dunlap | Mar. 24, 1959 |
| 2,923,643 | Rodwell | Feb. 2, 1960 |
| 3,036,633 | Mayhew | May 29, 1962 |

OTHER REFERENCES

Oil and Gas Journal, March 30, 1959, vol. 57, No. 14, pages 104–105, "Gilsonite Used in Cement Jobs."

UNITED STATES PATENT OFFICE
CERTIFICATE OF CORRECTION

Patent No. 3,070,450                                December 25, 1962

William G. Bearden et al.

It is hereby certified that error appears in the above numbered patent requiring correction and that the said Letters Patent should read as corrected below.

Column 3, line 56, 62 and 63, for "24 percent", each occurrence, read -- 34 percent --; column 6, line 31, after "mineral oil" insert a comma.

Signed and sealed this 18th day of June 1963.

(SEAL)
Attest:

ERNEST W. SWIDER
Attesting Officer

DAVID L. LADD
Commissioner of Patents